US009367570B1

(12) United States Patent  
Csillag et al.

(10) Patent No.: US 9,367,570 B1  
(45) Date of Patent: Jun. 14, 2016

(54) AD HOC QUERYABLE JSON WITH AUDIT TRAILS

(71) Applicant: Google Inc., Mountain View, CA (US)

(72) Inventors: Andrew Thomas Csillag, Wappingers Fall, NY (US); Michael Wayne Harm, New York, NY (US)

(73) Assignee: GOOGLE INC., Mountain View, CA (US)

( * ) Notice: Subject to any disclaimer, the term of this patent is extended or adjusted under 35 U.S.C. 154(b) by 239 days.

(21) Appl. No.: 13/779,673

(22) Filed: Feb. 27, 2013

Related U.S. Application Data

(60) Provisional application No. 61/621,960, filed on Apr. 9, 2012.

(51) Int. Cl.  
*G06F 17/30* (2006.01)

(52) U.S. Cl.  
CPC .............................. *G06F 17/30289* (2013.01)

(58) Field of Classification Search  
None  
See application file for complete search history.

(56) References Cited

U.S. PATENT DOCUMENTS

| | | | |
|---|---|---|---|
| 6,067,551 A * | 5/2000 | Brown et al. | |
| 6,529,905 B1 * | 3/2003 | Bray et al. | |
| 8,453,052 B1 * | 5/2013 | Newman et al. | 715/255 |
| 2008/0235579 A1 * | 9/2008 | Champion et al. | 715/273 |
| 2009/0125518 A1 * | 5/2009 | Bailor et al. | 707/8 |
| 2010/0070882 A1 * | 3/2010 | Wang et al. | 715/753 |
| 2010/0114817 A1 * | 5/2010 | Broeder | G06F 17/30607 707/612 |
| 2011/0252312 A1 * | 10/2011 | Lemonik et al. | 715/255 |
| 2011/0276627 A1 * | 11/2011 | Blechar et al. | 709/203 |
| 2011/0296317 A1 * | 12/2011 | Ishihara | G06F 17/2211 715/753 |
| 2012/0226776 A1 * | 9/2012 | Keebler | G06F 17/30578 709/217 |

* cited by examiner

*Primary Examiner* — Robert Beausoliel, Jr.  
*Assistant Examiner* — Pedro J Santos  
(74) *Attorney, Agent, or Firm* — McDermott Will & Emery LLP

(57) ABSTRACT

Techniques are described for storing JavaScript Object Notion (JSON) formatted data in a database object. A server receives first and second JSON formatted data identifying the database object associated with a first user and second user, respectively. The first and second JSON formatted data are stored with audit records in a data store such that identification of changes to the database object is possible. The server judges whether it is possible to merge the stored first and second JSON formatted data by using operational transformation on the stored audit records. If the merging is judged possible, the server applies the stored first JSON formatted data along with the stored second JSON formatted data to the database object by using operational transformation.

20 Claims, 3 Drawing Sheets

AD HOC QUERYABLE JSON WITH AUDIT TRAILS

CROSS-REFERENCE TO RELATED APPLICATIONS

The present application claims the benefit of priority under 35 U.S.C. §119 from U.S. Provisional Patent Application Ser. No. 61/621,960 entitled "Ad Hoc Queryable JSON with Audit Trails," filed on Apr. 9, 2012, the disclosure of which is hereby incorporated by reference in its entirety for all purposes.

BACKGROUND

Developers are always searching for simple data stores to use with their applications. In web-based systems (e.g. web applications) this has meant that robust systems used various forms of structured query language (SQL) databases, spreadsheets, or simple text files. SQL databases while powerful can have high costs and complexity while the other data stores often run into scalability and performance issues. To communicate with these data stores simple object access protocol (SOAP), extensible markup language (XML), JavaScript Object Notation Notion (JSON) or the like can be used. JSON is a data-interchange format like XML that is designed for easy readability. JSON is language independent and has two main structures. The first structure is a collection of name/value pairs such as an object or record. The second structure is an ordered list of values such as an array or list.

Single-table databases are a common data construct used in a variety of web-based systems such as workflow systems. For these single-table systems, much of the time is involves operations such as manipulation of one row of data at a time or displaying dashboards of data rows. In a SQL database, either of these operations can involve multiple query execution and data manipulation. In contrast, a JSON data store handles these operations quickly and with little overhead.

SUMMARY

The subject technology provides a computer-implemented method for a server to store JavaScript Object Notation (JSON) formatted data in a database object, the method including: receiving, at the server, first JSON formatted data identifying the database object from a first user over a communication network, from a computing device associated with the first user; receiving, at the server, second JSON formatted data identifying the database object from a second user over the communication network, from a computing device associated with the second user; storing the received first JSON formatted data and the second received JSON formatted data with an audit record in a data store such that identification of changes to the database object is possible; judging, by using operational transformation on the stored audit records for the first and second JSON formatted data, whether it is possible to merge the stored first JSON formatted data with the stored second JSON formatted data; and applying the stored first JSON formatted data along with the stored second JSON formatted data to the database object by using operational transformation if the merging is judged possible.

Yet another aspect of the subject technology provides a system. The system includes memory, one or more processors, a data store comprising database objects, and one or more modules stored in memory and configured for execution by the one or more processors. The system includes an audit trail recorder module operatively configured to: receive a first and second JSON formatted data identifying a particular database object, the first JSON formatted data identifying a computing device associated with a first user, the second JSON formatted data identifying another computing device associated with a second user, add an associated audit record to each received JSON formatted data which identifies requested changes to the particular database object, store the each JSON formatted data with the associated audit record in the data store. The system further includes an operational transform judger module operatively configured to store changes to the particular database object as a result of determining that merging of requested changes to the particular database object from the stored first and second JSON formatted data is possible without causing data corruption by using operational transformation on the stored audit records for the first and second JSON formatted data.

The subject technology further provides for a non-transitory computer-readable storage media storing instructions that, when executed by a computer server, causes the computer server to perform operations that store JavaSciipt Object Notation (JSON) formatted data in a database object on the server, the operations including: receiving, at the server, first JSON formatted data identifying the database object from a first user over a communication network, from a computing device associated with the first user; receiving, at the server, second JSON formatted data identifying the database object from a second user over the communication network, from a computing device associated with the second user; storing the received first JSON formatted data and the second received JSON formatted data with an audit record in a data store such that identification of changes to the database object is possible; judging, by using operational transformation on the stored audit records for the first and second JSON formatted data, whether it is possible to merge the stored first JSON formatted data with the stored second JSON formatted data; and applying the stored first JSON formatted data along with the stored second JSON formatted data to the database object by using operational transformation if the merging is judged possible.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

An example solution is a JSON data store operating within a storage and indexing service. The storage and indexing service preferably has SQL-like capabilities while preserving scalability, high availability and low cost of storage infrastructure. The storage and indexing service also should support an intuitive application programming interface (API) that is language agnostic with a rich SQL-like query syntax, an extensible schema, simple caching, support for performance analysis and debugging, and permit tuning of parameters from the schema itself. In addition, the storage and indexing service preferably has access control list (ACL) support for user data search and access. Such ACL support could include encryption, geolocation, retention, discovery, liberation, etc. In short, the storage and indexing service should have indexing, ACL, and other SQL-like capabilities without the cost and overhead.

The JSON data store sits on top of the storage and indexing service and adds audit records or audit trails of the changes to the data objects in the data store as things progress. These audit records enable diagnosis or production issues and questions about perceived data-corruption. Additionally, these audit records can be used for operational transforms (mutations) that would permit collaboration in the data store.

With an audit record, the state of the JSON data store can be reconstructed at any point in time. These audit records are preferably stored in docs-terms as mutations. With mutations an operational transform can be used to allow the kinds of real-time collaborative operations that other docs properties have. Triggers can also be implemented in the data store with an extension. This extension which fires on data change will post an event to the Object Broker which then scripts could listen to. These events can be either synchronous, which would allow the called script to veto the operation if it wanted, or asynchronous. Also, a user can hold a longish-term write-lock on a record in the JSON data store (e.g., while their browser is open) while they edit it, and automatically release the lock once they move to a different record (e.g. close their browser or move to another page).

Figure 1:
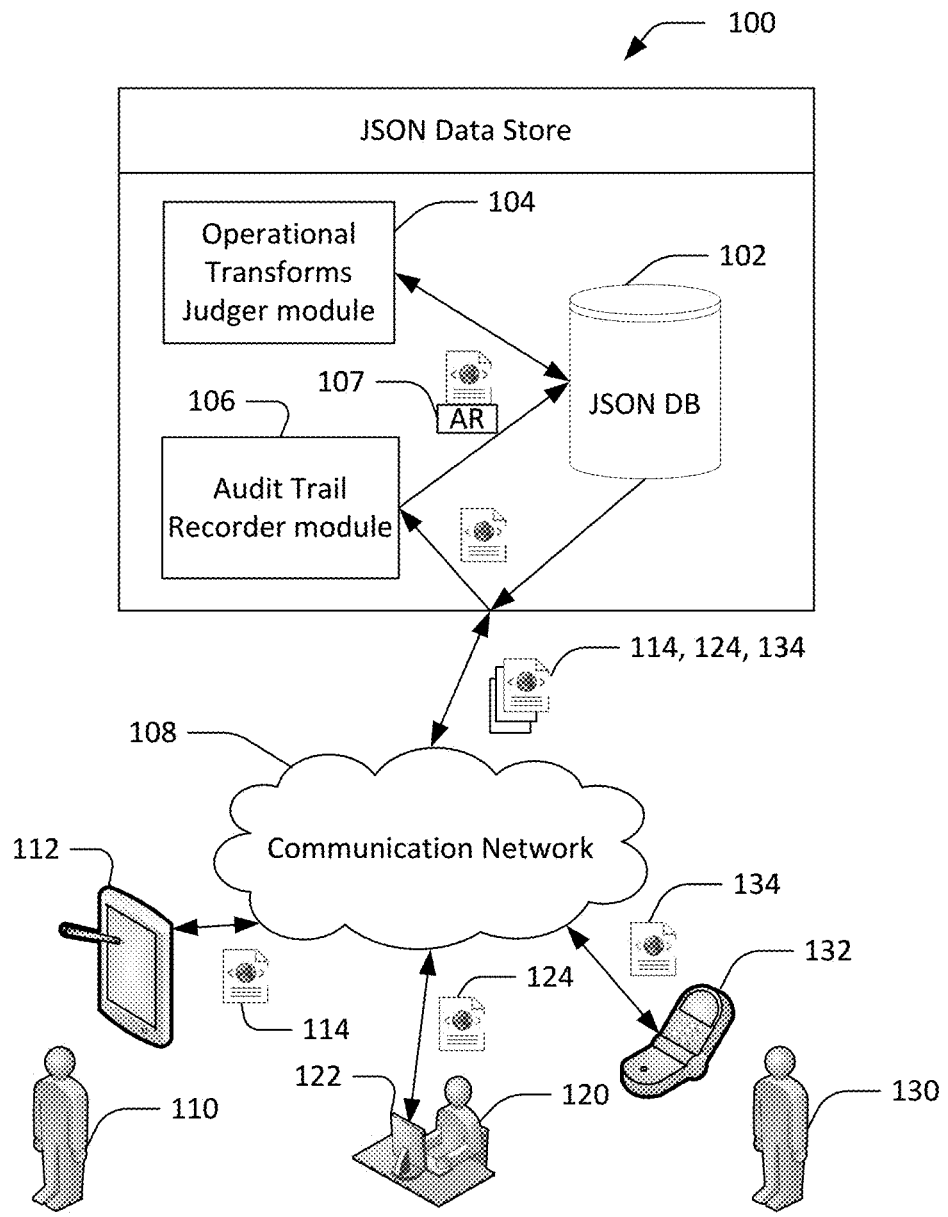
FIG. 1 is a block diagram illustrating an example system implementing a JSON formatted data store with audit trails.

FIG. 1 illustrates an example system implementing a JSON formatted data store 100 with audit trails. The system can include memory, one or more processors, and one or more modules stored in memory and configured for execution by the one or more processors. The JSON database (DB) 102 within this data store 100 utilizes two main data structures; namely an object and an array. The object is an unordered set of name-value pairs. An example JSON object is as follows:

{a: {b: 1, c:2, d:[1,3,5]}} where a JSON object begins with a {(a left brace) and ends with a} (a right brace). Each name is followed by a: (a colon) and name-value pairs are separated by a, (a comma). In this example, the first name is "a" and the first value is "{b:1, c:2, d:[1,3,5]}". Nested inside the first value is another name-value pair with a second name of "b" and a second value of "1". Also nested inside the first value is another name-value pair with a third name of "d" and a third value of "[1,3,5]". This third value contains an example of the other JSON data structure, an array.

A JSON array is an ordered collection of values. An array begins with [(a left bracket) and ends with a] (a right bracket). Values are separated by a, (a comma). An example JSON array is as follows:

[1,3,5]

where this JSON array contains three values of "1" and "3" and "5".

Figure 2:
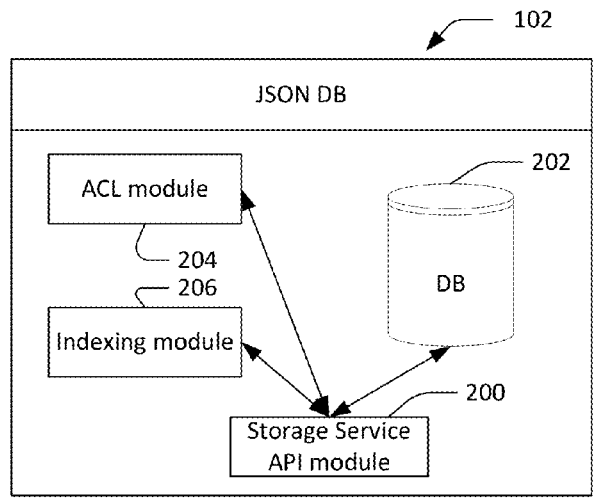
FIG. 2 is a block diagram illustrating an example JSON database.

The JSON data store 100 may include several modules for providing different functionality. In the example implementation of a JSON formatted data store 100, the JSON DB 102 as shown in FIG. 2 is implemented on top of an underlying storage and indexing service that accepts key-value pairs through a storage service API module 200. This storage service API module 200 translates these JSON data structures into key-value pairs and stores the translated name-value pairs into a database 202. In the foregoing example the JSON object would have keys of a, a.b, a.c, a.d, a.d[0], a.d[1], a.d[2]. As such the values would be single value arrays or map 1 and 2 as well as multi value array 1, 3, and 5. It will be appreciated by those skilled in the art that the database 202 of the storage and indexing service can be implemented in a variety of forms using any number of technologies such as active databases such as SQL or DB2, cloud databases, or data warehouses without departing from the scope and spirit of the example implementation described herein. Preferably, the storage and indexing service preferably has ACL support module 204 that interacts with the storage service API module 200 to provide user data search and access control. Such ACL support could include encryption, geo-location, retention, discovery, and liberation. In addition, the storage service API module 200 preferably interacts with indexing functionality module 206 to enhance the performance (speed) of accessing key-value pairs in the database 202.

Referring once again to FIG. 1, the JSON data store 100 has an audit trail recorder module 106 which is capable of receiving JSON formatted data 114, 124, 134 from a communication link to a communication network 108 (e.g., the Internet). This JSON formatted data 114 can come from a variety of sources such as a first user 110 operating a tablet computing device 112 that is also coupled to the communication network 108 through a communication link.

For example, the audit trail recorder module 106 may receive first JSON formatted data 114 with an identifier (ID) (e.g., a database object ID) identifying a particular database object in the JSON DB 102. This first JSON formatted data 114 also includes a User ID that identifies a computing device 112 associated with a first user 110. The audit trail recorder module 106 adds an associated audit record 107 to the received JSON formatted data 114 which identifies requested changes to the particular database object. At about the same instance in time, audit trail recorder module 106 also receives second JSON formatted data 124 with the same ID identifying the same database object in the JSON DB 102. This second JSON formatted data 124 also includes a User ID that identifies a computing device 122 associated with a second user 120. This means that at this particular instance in time two separate users are attempting to make changes to the same database object. The audit trail recorder module 106 adds an associated audit record 107 to the received JSON formatted data 124 which identifies the requested changes to the particular database object. In some instances, it may also be helpful for this audit record 107 to include information such as when this change was requested, a version number for this change, or who requested the change. Collectively audit records about the same database object form an audit trail about the DB object that describes what changes were made, when they were made and by whom they were made. If multiple users can interact with the same DB objects as the same time in the JSON data store 100, then the JSON data store 100 is similar to a document collaboration environment. A change to a JSON DB object, like a change to a collaborative document, can be referred to as a mutation. These audit records 107 essentially describe each mutation of a DB object. This JSON formatted data 114, 124 with the associated audit record 107 is subsequently stored in the JSON DB 102 by the audit trail recorder so that a record of mutations is kept by the JSON DB 102.

Having record of mutations (audit records 107) in JSON DB 102 enables several types of functionality for the JSON data store 100. For example, a particular DB object can be restored to any previous state or condition by applying or undoing selected mutations for the DB object. To manage the application of these mutations to a DB object, an operational transform judger module 104 evaluates each mutation prior to making a change to the DB object stored in JSON DB 102.

In general, an operational transformation (OT) is a technology for supporting a range of collaboration functions. Some of these functions include concurrent changes to objects, triggers, short term object locking, and the like. The basic idea of OT can be illustrated with an example. In this example, a text document has a string "xyz" replicated at two collaborating locations (e.g., two users having the same document open at the same time). The two users may have two concurrent operations where User 1 has a first mutation (to insert character "w" at position "0") that can be expressed as UOP1=Insert[0, "w"]. User 1 has a second mutation (to delete the character "z" at position "2") that can be expressed as UOP2=Delete[2, "z"]. If the audit records 107 indicate that UOP1 is supposed to occur before UOP2, then the following occurs. After executing UOP1, the document becomes "wxyz". To execute UOP2 after UOP1, UOP2 must be transformed against UOP1 to become UOP'=Delete[3, "z"]. In this OT the positional parameter is incremented by one due to the insertion of one character "w" by UOP2. As a result, when executing UOP2' on "wxyz" shall delete the correct character "z" and the document becomes "wxy". However, if UOP2 is executed without an OT, then the wrong character could be deleted. In this case, if UOP2 is executed, then "y" could be deleted rather than "z". In essence, OT adjust the parameters of a change operation according to the effects of previously executed concurrent operations so that the transformed operation can achieve the correct effect and maintain document consistency.

For example, operational transform judger module 104 can utilize an operational transformation on the stored audit records 107 for the first 114 and second 124 JSON formatted data to determine whether merging of requested changes to the particular database object from the stored first 114 and second 114 JSON formatted data is possible without causing data corruption. If it is so determined, then the mutations or changes indicated by the audit records 107 for the first 114 and second 124 JSON formatted data are applied to the particular database object and an updated version of the particular database object is stored by the operation transform judger 104 in JSON DB 102.

Continuing on with this example implementation, the audit trail recorder may receive a third JSON formatted data 134 identifying the same particular database object and identifying a computing device 132 associated with a third user 130. The audit trail recorder module 106 adds an associated audit record 107 to the received JSON formatted data 134 which identifies the requested changes to the particular database object. In this instance, the operational transform judger module 104 blocks a requested change from the third user 130 to the particular database object as a result of determining that merging of requested changes to the particular database object from the stored third JSON formatted data 134 is not possible without causing data corruption. This potential data corruption can be identified with an operational transformation (OT) on the stored audit records 107 for the first, second, and third JSON formatted data.

If the earlier example is expanded so that the text string has a value "xyz" with UOP1=Insert[0, "w"] and UOP2=Delete[2, "z"]. The third user 130 may add a third mutation (to move character "z" from position "2" to position "0") that can be expressed as UOP3=Move[0, "z"]. If the audit trail records indicate that UOP3 follows UOP2 in sequence, then data corruption could occur because UOP2 character "z" was deleted and as such is not available for a Move operation by UOP3. An OT would identify this potential problem and therefore could prevent a move of the "y" character that could result in a string of "ywx". Such a string would be considered a data corruption that none of the users collaborating the document had intended.

Figure 3:
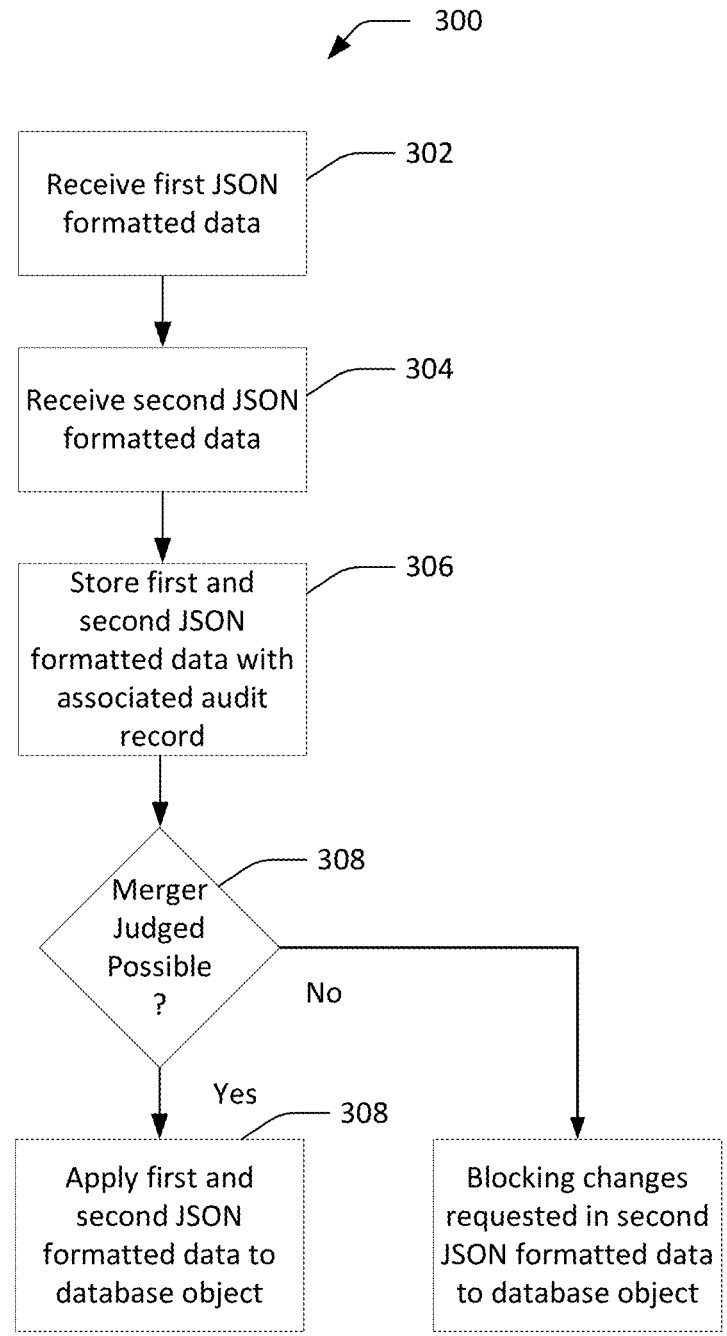
FIG. 3 is a flow chart illustrating an example method for server to store JSON formatted data in a database object.

FIG. 3 is a flow chart illustrating an example method/process 300 for a server to store JSON formatted data in a database object. In some configurations, the process 300 may be implemented by one or more computing devices or servers. As shown here, the process 300 begins with operation 302 of receiving, at the server, first JSON formatted data identifying the database object from a first user over a communication network, from a computing device associated with the first user. Second JSON formatted data identifying the database object is also received 304 at the server from a second user over the communication network, from a computing device associated with the second user. The received first JSON formatted data and the second received JSON formatted data with an audit record are stored 306 in a data store such that identification of changes to the database object is possible. Whether it is possible to merge the stored first JSON formatted data with the stored second JSON formatted data is judged 308 by using operational transformation on the stored audit records for the first and second JSON formatted data. Subsequently, the stored first JSON formatted data is applied 308 along with the stored second JSON formatted data to the database object by using operational transformation, if the merging is judged possible. Alternatively, a requested change to the particular database object is blocked 310 in response to determining that merging of requested changes to the particular database object from the stored second JSON formatted data is not possible without causing data corruption after performing an operational transformation on the stored audit records for the first and second JSON formatted data.

Figure 4:
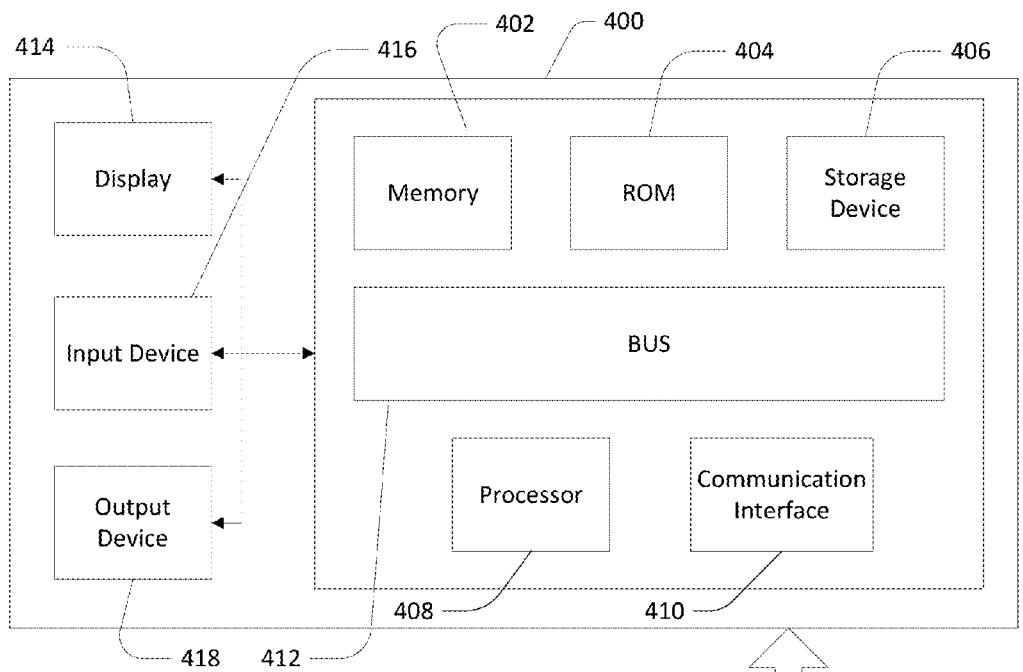
FIG. 4 is a block diagram of a computing device for implementing one or more embodiments of the example implementations.
Figure 4:
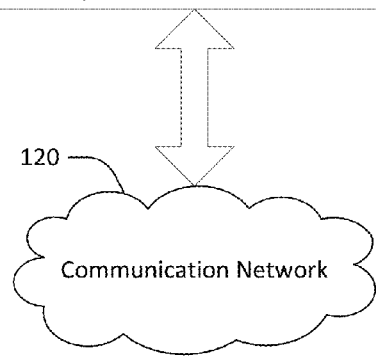

FIG. 4 is a block diagram illustrating an example computer system or computing device 400 with which a client computing device, 112, 122, 132, and server computing device 100 of FIG. 1 can be implemented. In certain aspects, the computer system 400 may be implemented using hardware or a combination of software and hardware, either in a dedicated server, or integrated into another entity, or distributed across multiple entities. Computing device 400 can also be embedded in another device, for example, and without limitation, a mobile or cellular telephone, a personal digital assistant (PDA), a mobile audio player, a Global Positioning System (GPS) receiver, a video game console, and/or a television set top box.

In a basic configuration, computing device 400 may include at least one processor 408 (central processing unit, or CPU), a system memory 402, 404, and a system bus 412 for communicating information between the processor 408 and memory 402, 404 as well as other hardware components in the computing device 400.

Depending on the configuration and type of computing device, system memory may comprise, but is not limited to, volatile (e.g. random access memory (RAM)) 402, non-volatile (e.g. read-only memory (ROM)) 404, flash memory, or any combination. The memory 402, 404 may include an operating system, one or more programming modules, and may include a program data. The operating system, for example, may be suitable for controlling operations of the computing device 400. Collectively this programming code creates an execution environment for the computer device that may include processor firmware, a protocol stack, a database management system, an operating system, or a combination of one or more of them stored in a memory 402, 404. Example implementations may be practiced in conjunction with a graphics library, other operating systems, or any other application program and is not limited to any particular application or system.

Computing device 400 may have additional features or functionality. For example, computing device 400 may also include additional data storage devices 406 (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. Memory 402, ROM 404, and storage device 406 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of computing device 400. Computing device 400 may also have input device(s) 416 such as a keyboard, a mouse, an electronic pen, an electronic tablet, a sound input device, a touch input device, electronic tablet, etc. Computing device 400 may also have a display 414 such as a CRT (cathode ray tube) or LCD (liquid crystal display) monitor, for displaying information to the user. Other output device(s) 418 such as speakers, a printer, etc. may also be included with the computing device 400 to convey information the user. The aforementioned devices are examples and others may be used.

Although the computer or computing device 400 has been described with various components, one skilled in the art will appreciate that such a computer or computing device can contain additional or different components and configurations. In addition, although aspects of an implementation consistent with the example implementations are described as being stored in memory 402, 404, one skilled in the art will appreciate that these aspects can also be stored on or read from other types of computer program products or computer-readable media, such as secondary storage devices 406, including hard disks, floppy disks, or CD-ROM, DVD, or flash drive; a carrier wave from the Internet or other network; or other forms of RAM or ROM. One skilled in the art would recognize that computing devices may be client or server computers. Client computers and devices 112, 122, 132 are those used by end users to access information from a server over a network 108, such as the Internet. Servers, such as the JSON data store 100, are understood to be those computing devices that provide services to other machines, and may be (but are not required to be) dedicated to hosting applications or content to be accessed by any number of client computers. Web servers, application servers, print servers, file servers, communication servers, distributed servers, and data storage servers may be hosted on the same or different physical machines.

Computing device 400 may also contain a communication interface 410 that may allow device 400 to communicate with other computing devices, such as over a network or network infrastructure 108 in a distributed computing environment, for example, an intranet or the Internet. The network infrastructure may include hardware elements such as computing devices, servers, routers, hubs, firewalls, clients, personal computers, communication devices, routing devices and other active and passive devices, modules and/or components as known in the art. Communication interface 410 is one example of communication media. Communication media may include computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media that forms a communication link between two computing devices may include wired media such as a wired network or direct-wired connection, and wireless media such as acoustic, radio frequency (RF), infrared, and other wireless media.

As stated above, a number of program modules and data files may be stored in memory 402 and ROM 404. While executing on processor 408, programming modules may perform processes including, for example, one or more method operations as described above. The aforementioned process is an example, and processor 408 may perform other processes.

Generally, consistent with example implementations, program modules may include routines, programs, components, data structures, and other types of structures that may perform particular tasks or that may implement particular abstract data types. Moreover, an example implementation may be practiced with other computer system configurations, including hand-held devices, multiprocessor systems, microprocessor-based or programmable consumer electronics, minicomputers, mainframe computers, and the like. Example implementations may also be practiced in distributed computing environments where tasks are performed by remote processing devices that are linked through a communications network. In a distributed computing environment, program modules may be located in both local and remote memory storage devices. Furthermore, example implementations may be practiced in an electrical circuit comprising discrete electronic elements, packaged or integrated electronic chips containing logic gates, a circuit utilizing a microprocessor, or on a single chip containing electronic elements or microprocessors.

Example implementations, may be implemented as a computer process (method), a computing system, or as an article of manufacture, such as a computer program product or computer readable media. The computer program product may be a computer storage media readable by a computer system and encoding a computer program of instructions for executing a computer process. One or more modules of computer program instructions (code) are encoded on a computer readable medium for execution by, or to control the operation of, the computer system 400. These software modules may be written in programming code according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

Accordingly, the example implementations may be embodied in hardware and/or in software (including firmware, resident software, micro-code, software modules etc.). In other words, embodiments of the example implementations may take the form of a computer program product on a non-transitory computer usable or non-transitory computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the example implementations, for example, are described above with reference to block diagrams and/or operational illustrations of methods, systems, and computer program products according to embodiments of the example implementations. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to non-transitory tangible, physical objects that store information in a form that is readable by a computer. These terms exclude wireless signals, wired download signals, and other ephemeral signals.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for a server to store JavaScript Object Notation (JSON) formatted data in a database object, the method comprising:
   receiving, at the server, first JSON formatted data identifying the database object over a communication network from a computing device associated with a first user;
   receiving, at the server, second JSON formatted data identifying the database object over the communication network from a computing device associated with a second user;
   adding, at the server, an audit record to each of the received first and second JSON formatted data identifying changes to the database object;
   storing the received first JSON formatted data and the received second JSON formatted data with their respective audit records in a data store;
   judging, by using operational transformation on the stored audit records associated with the first and second JSON formatted data, that it is possible to merge the stored first JSON formatted data with the stored second JSON formatted data;
   modifying, using operational transformation, the audit record associated with the stored second JSON formatted data based on the audit record associated with the stored first JSON formatted data; and
   applying the changes indicated by the audit record associated with the stored first JSON formatted data along with the changes indicated by the modified audit record associated with the stored second JSON formatted data to the database object.

2. The method of claim 1 further comprising:
receiving a third JSON formatted data identifying the particular database object and identifying a computing device associated with a third user; and
adding, at the server, an audit record identifying changes to the database object to the third JSON formatted data;
storing the received third JSON formatted data with the audit record in the data store.

3. The method of claim 2 further comprising:
blocking a requested change to the particular database object in response to determining that merging of requested changes to the particular database object from the stored third JSON formatted data is not possible without causing data corruption after performing an operational transformation on the stored audit records for the first, second, and third JSON formatted data.

4. The method of claim 1, wherein the first JSON formatted data includes a user identifier that identifies the computing device associated with the first user.

5. The method of claim 1, wherein the first JSON formatted data includes a database object identifier identifying the database object.

6. The method of claim 1, wherein the audit record for the first JSON formatted data includes data indicating when a change to the database object was requested, a version number for the change to the database object, or a user that requested the change to the database object.

7. The method of claim 1, wherein the stored audit records for the database object comprise an audit trail about the database object.

8. The method of claim 7, wherein the audit trail describes changes that were made to the database object, when the changes were made, and who made the changes.

9. The method of claim 1, wherein using the operational transformation on the stored audit records determines an order of changes to the database object based on the stored first JSON formatted data and the stored second JSON formatted data.

10. The method of claim 9, wherein operation transformation modifies the changes to the database object based on the stored second JSON formatted data according to effects of the changes to the database object based on the stored first JSON formatted data.

11. The method of claim 1, wherein the merging is judged possible if merging the stored first JSON formatted data with the stored second JSON formatted data occurs without data corruption.

12. The method of claim 3, wherein the data corruption occurs when a respective change is made to deleted data based on a previous change to the database object.

13. A system for providing a JavaScript Object Notation (JSON) formatted data store with audit trails, the system comprising:
memory;
one or more processors;
a data store comprising database objects; and
one or more modules stored in memory and configured for execution by the one or more processors, the modules comprising:
an audit trail recorder module operatively configured to:
receive a first and second JSON formatted data identifying a particular database object, the first JSON formatted data identifying a computing device associated with a first user, the second JSON formatted data identifying another computing device associated with a second user,
add an associated audit record to each received JSON formatted data which identifies requested changes to the particular database object, and
store the each JSON formatted data with the associated audit record in the data store; and
operational transform judger module operatively configured to:
judge, by using operational transformation on the stored audit records associated with the first and second JSON formatted data, that it is possible to merge the stored first JSON formatted data with the stored second JSON formatted data,
modify, by using operational transformation, the audit record associated with the stored second JSON formatted data based on the audit record associated with the stored first JSON formatted data, and
apply the changes indicated by the audit record associated with the stored first JSON formatted data along with the changes indicated by the modified audit record associated with the stored second JSON formatted data to the database object.

14. The system of claim 13, wherein the audit trail recorder module is further operatively configured to receive a third JSON formatted data identifying the particular database object and identifying a computing device associated with a third user and to add an associated audit record to the third JSON formatted data which identifies changes to the database object, and wherein the operational transform judger is further operatively configured to block a requested change to the particular database object as a result of determining that merging of requested changes to the particular database object from the stored third JSON formatted data is not possible without causing data corruption by using operational transformation on the stored audit records for the first, second, and third JSON formatted data.

15. The system of claim 13, Wherein the audit record for the first JSON formatted data includes data indicating when a change to the database object was requested, a version number for the change to the database object, or a user that requested the change to the database object.

16. The system of claim 13, wherein the stored audit records for the database object comprise an audit trail about the database object.

17. The system of claim 16, wherein the audit trail describes changes that were made to the database object, when the changes were made, and who made the changes.

18. The system of claim 13, wherein the data corruption occurs when a respective change is made to deleted data based on a previous change to the database object.

19. A non-transitory computer-readable storage media storing instructions that, when executed by a computer server, causes the computer server to perform operations that store JavaScript Object Notation (JSON) formatted data in a database object on the server, the operations comprising:
receiving, at the server, first JSON formatted data identifying the database object f over a communication network from a computing device associated with a first user;
receiving, at the server, second JSON formatted data identifying the database object over the communication network from a computing device associated with a second user;
adding, at the server, an audit record to each of the received first and second JSON formatted data identifying changes to the database object;

storing the received first JSON formatted data and the received second JSON formatted data with their respective audit records;

judging, by using operational transformation on the stored audit records associated with for the first and second JSON formatted data, that it is possible to merge the stored first JSON formatted data with the stored second JSON formatted data;

modifying, using operational transformation, the audit record associated with the stored second JSON formatted data based on the audit record associated with the stored first JSON formatted data; and applying the changes indicated by the audit record associated with the stored first JSON formatted data along with the changes indicated by the modified audit record associated with the stored second JSON formatted data to the database object.

20. The computer-readable storage media of claim 19, wherein the operations further comprise:

receiving a third JSON formatted data identifying the particular database object and identifying a computing device associated with a third user;

adding, at the server, an audit record to the received third JSON formatted data identifying changes to the database object;

storing the received third JSON formatted data with the audit record in the data store; and blocking a requested change to the particular database object in response to determining that merging of requested changes to the particular database object from the stored third JSON formatted data is not possible without causing data corruption after performing an operational transformation on the stored audit records for the first, second, and third JSON formatted data.

* * * * *